United States Patent [19]

Collard, Jr.

[11] 4,321,801
[45] Mar. 30, 1982

[54] JET OPERATED HEAT PUMP

[76] Inventor: Thomas H. Collard, Jr., 900 NE. Loop 410, Petroleum Center, San Antonio, Tex. 78209

[21] Appl. No.: 228,338

[22] Filed: Jan. 26, 1981

[51] Int. Cl.³ .............................................. F25B 27/02
[52] U.S. Cl. .................................... 62/238.4; 62/268; 62/500
[58] Field of Search ...................... 62/100, 116, 238.4, 62/268, 500; 137/890; 417/183

[56] References Cited

U.S. PATENT DOCUMENTS

| | | | |
|---|---|---|---|
| 3,338,173 | 8/1967 | Gunzel, Jr. et al. | 137/891 |
| 3,680,327 | 8/1972 | Stein | 62/500 |
| 3,891,353 | 6/1975 | Templeman | 417/183 |
| 3,922,877 | 12/1975 | Ophir et al. | 62/500 |
| 4,192,148 | 3/1980 | Von Kreudenstein | 62/500 |

Primary Examiner—Ronald C. Capossela
Attorney, Agent, or Firm—Gunn, Lee & Jackson

[57] ABSTRACT

A jet pump system is shown that utilizes waste heat to provide heating and/or cooling. Waste heat diverted through a boiler causes a refrigerant to evaporate and expand for supersonic discharge through a nozzle thereby creating a vacuum in an evaporator coil. The vacuum draws the refrigerant in a gaseous state into a condensing section of a jet pump along with refrigerant from a reservoir in a subcooled liquid form. This causes condensation of the gas in a condensation section of the jet pump, while moving at constant velocity. The change in momentum of the fluid overcomes the system high side pressure. Some of the condensate is cooled by a subcooler. Refrigerant in a subcooled liquid state from the subcooler is fed back into the evaporator and the condensing section with an adequate supply being insured by the reservoir. The motive portion of the condensate is returned to the boiler sans subcooling. By proper valving start-up is insured, as well as the ability to switch from heating to cooling.

11 Claims, 7 Drawing Figures

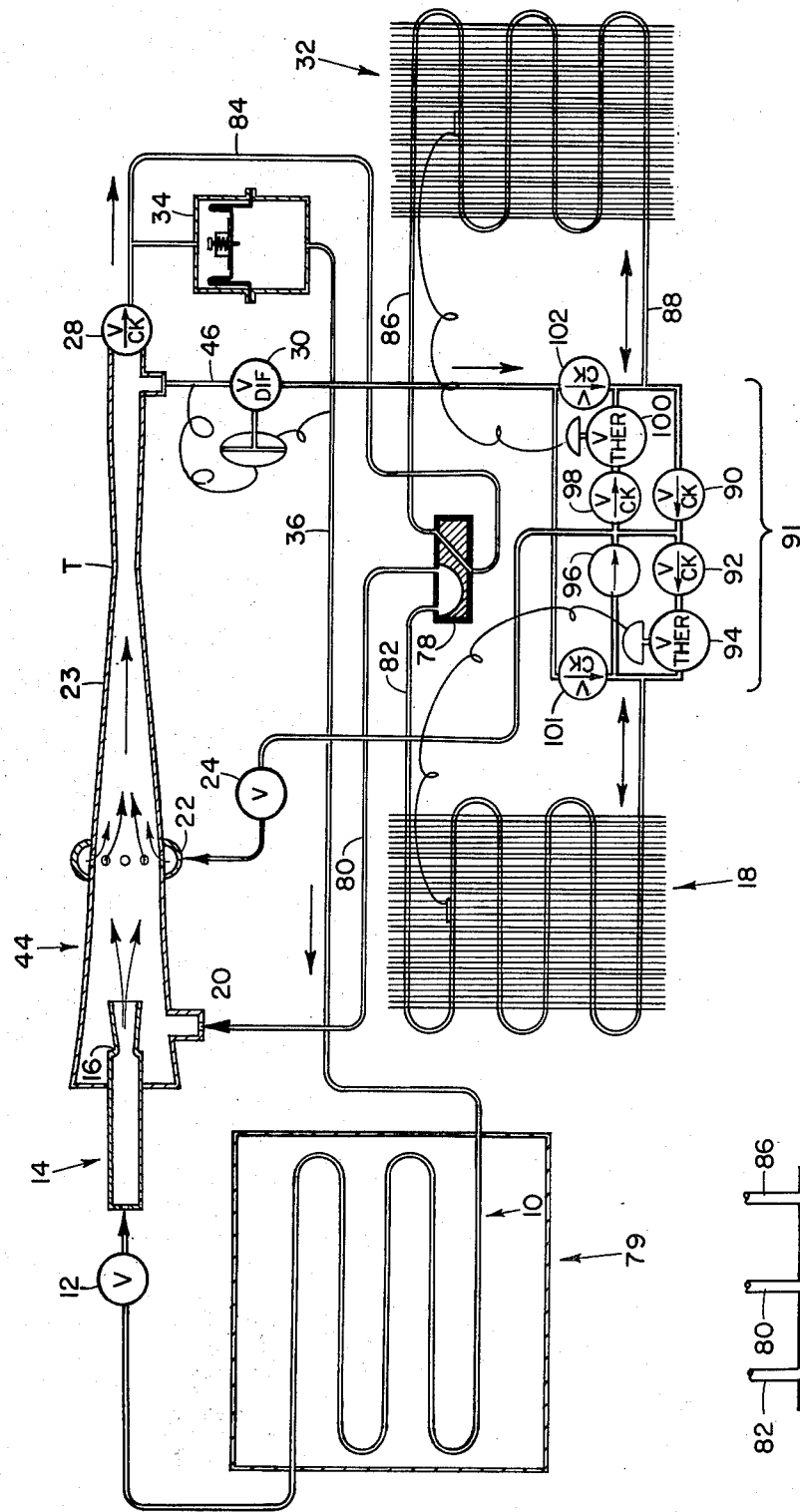

4,321,801

JET OPERATED HEAT PUMP

BACKGROUND OF THE INVENTION

The present invention relates to a heating and/or cooling system having a jet heat pump which by its construction and operation condenses gases prior to those gases entering a subcooler. The invention utilizes waste heat which may be generated by a variety of sources, such as heat from the exhaust of an automobile or from an automobile radiator.

BRIEF DESCRIPTION OF THE PRIOR ART

Various types of ejectors, such as those commonly utilized in jet heat pumps, are illustrated throughout the prior art. A variable fluid proportioner as shown in U.S. Pat. No. 3,338,173 to Gunzel, Jr., et al. is a device for introducing a first fluid into a stream containing a second fluid by the use of a venturi effect. An outer pipe has an inner pipe located inside thereof with a passageway through the outer pipe in communication with the interior of the inner pipe. The outer pipe is adjustable with respect to the inner pipe to adjust the proportions of the fluid flowing between the pipes. The device as disclosed by Gunzel, Jr., et al. has been especially useful for mixing liquid fertilizer with water for distribution through lawn sprinklers.

Another type of ejector is utilized in the steam jet refrigeration apparatus disclosed in U.S. Pat. No. 3,680,327 to Stein. The compound ejector utilized in this patent is for high pressure steam, and can be adapted to be utilized also with low pressure steam systems. The ejector forms a mixture of steam and vapor inside a diffuser. The steam and vapor is then condensed inside of a condenser. The invention of Stein is primarily for utilization for steam jet refrigeration machines, such as liquid coolers and as air and gas coolers in different combinations.

Another type of ejector is a jet booster as illustrated in U.S. Pat. No. 3,891,353 to Templeman. In this patent, the jet booster has a high pressure driving fluid which is used to entrail low pressure fluid induced into the booster. The low pressure fluid is then compressed to an intermediate pressure. High pressure gases are delivered through a nozzle into a mixing throat. Upon discharge of the high pressure gases through the nozzle, they draw a low pressure gas into the mixing throat via an inlet. A pressure controller either enlarges or decreases the size of the mixing throat by inflating or deflating a flexible sleeve. The jet booster as disclosed in Templeman is used in the gas industry to enable energy available in high pressure gas to be used to entrain gas stored at low pressure, and to compress it to an intermediate pressure required for distribution system.

SUMMARY OF THE INVENTION

It is an object of the present invention to provide a heating and/or cooling system having a jet pump operated system utilizing waste heat to increase the energy of the motive gas in the system.

It is a further object of the present invention to provide a cooling system having a jet operated heat pump within the system to be used in an automobile or other confined space and to operate utilizing waste heat from the automobile, or from other sources.

It is yet another object of the present invention to provide a heating and/or cooling system having a jet operated heat pump within the system comprising (1) a boiler of a tube-in-tube or other heat exchanger type arrangement, (2) an evaporator operating on a vacuum drawn by the motive gas supersonically ejected from a nozzle into a condensing section, (3) a subcooler which provides liquid refrigerant to be mixed with the motive gas of the same composition ejected from the nozzle and achieving a condensed form of that gas, (4) a variable volume reservoir in direct communication with the subcooler to maintain specific pressure on the subcooled liquid within the system, (5) a variety of control valves, check valves, differential pressure valves, and (6) thermostatic expansion valves in communication within the system to perform their various functions.

It is yet still another object of the present invention to provide a heating and/or cooling system having a jet operated pump within the system utilizing (1) waste heat to increase the energy of the motive gas in the system and (2) a reversing valve to provide both heating and cooling to a confined area utilizing a single system. This heating and/or cooling system comprises a boiler in communication with a nozzle which is capable of ejecting motive gas at supersonic velocity, the motive gas when ejected drawing a vacuum on an evaporator, and the ejected motive gas subsequently combining with liquid refrigerant injected into a condensing throat to a variable volume reservoir. Some of the condensed motive gas and liquid refrigerant travel to a cooler whereupon the mixture is cooled below its saturation temperature, and whereupon the condensate is returned either to the evaporator or the condensing section. The non-subcooled liquid returns to the boiler.

BRIEF DESCRIPTION OF THE DRAWINGS

FIGS. 6 and 6a are a schematic diagram of a heating and/or cooling system of the present invention having a reversing valve, thereby allowing a single system to provide both heating and cooling, and a detail drawing of the reversing valve, respectively. The same components of a boiler, jet operated pump, evaporator, condensing throat, variable volume reservoir, subcooler, and various valves having specific functions are also utilized in the system as illustrated.

DESCRIPTION OF THE PREFERRED EMBODIMENTS

Figure 1:
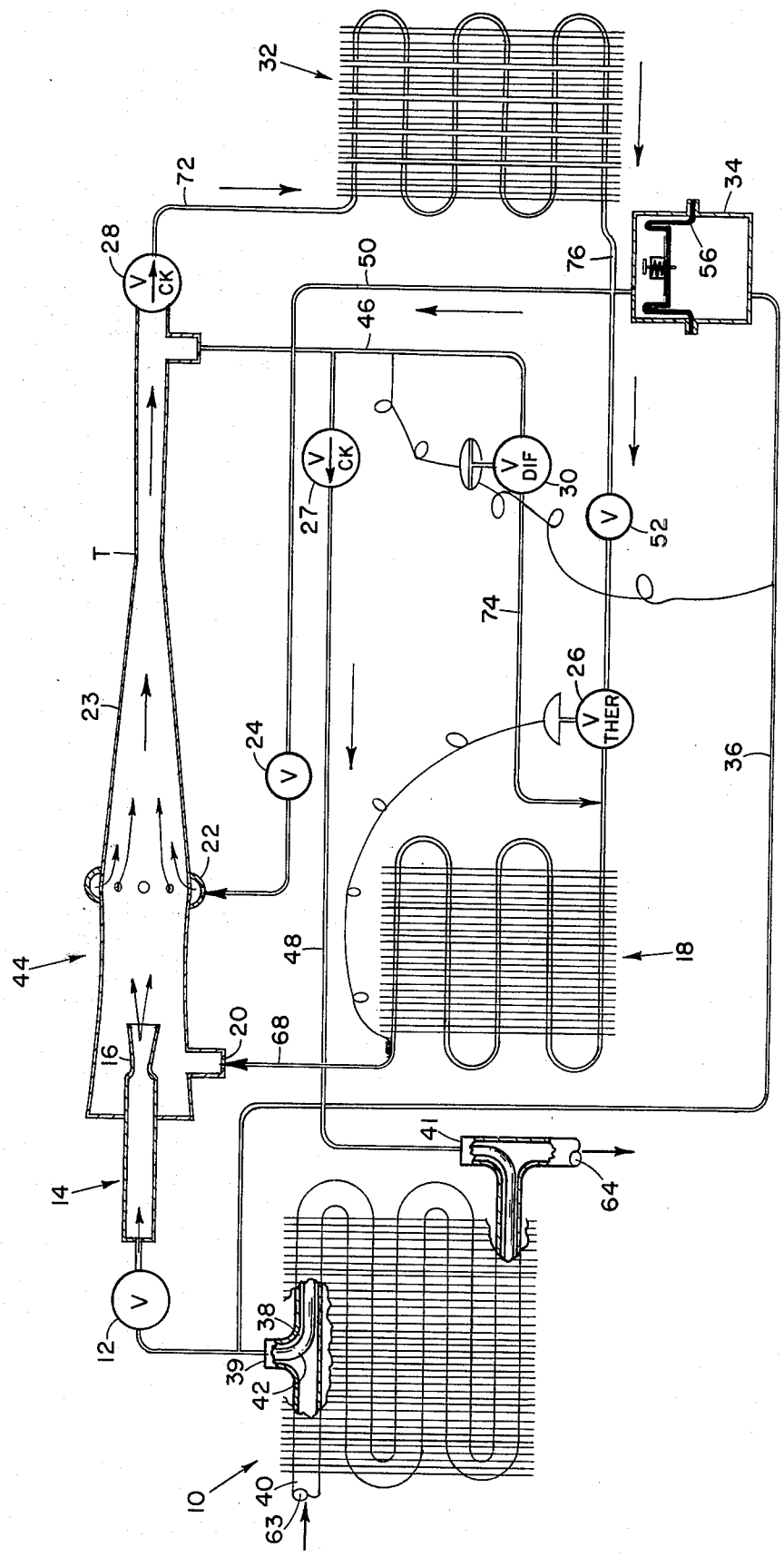
FIG. 1 is a schematic diagram of a cooling system of the present invention showing a boiler, evaporator, jet operated pump, condensing throat, subcooler, variable volume reservoir, and various valves.

For a detailed description of the invention, reference is made to the attached drawings wherein the invention is illustrated. Identical reference characters will be utilized to refer to identical or equivalent components throughout the various views in the following description.

The cooling system as schematically depicted in FIG. 1 comprises boiler 10, control valve 12, jet operated pump 44, with nozzle 16, evaporator 18, evaporator suction port 20, subcooled liquid refrigerant port 22, condensing throat 23, valve 24, thermo-expansion valve 26, check valve 28, differential pressure valve 30, subcooler 32, variable volume reservoir 34, and boiler return line 36. Boiler 10 can be a tube-in-tube type configuration as shown in the cutaway section 38. Liquid with waste heat from a source (not shown) circulates through outer tube 40 thereby heating the motive fluid contained within inner tube 42. The outer tube 40 is sealed to the inner tube 42 at exit/entrance points 39 and 41 for the inner tube 42.

The heat applied to the motive fluid causes the motive fluid to change from the liquid state to the gaseous state, thereby causing pressure due to the gaseous expansion. Once a predetermined pressure has been obtained, control valve 12 opens to allow the motive fluid in a gaseous state to pass therethrough.

Inner tube 42 connects through control valve 12 to jet operated pump 44 having a nozzle 16. The outlet of nozzle 16 is directed into condensing section 23 having a condensing throat T. Within condensing section 23 motive fluid ejected from nozzle 16 and suction gas from evaporator 18 combine with subcooled liquid refrigerant introduced into condensing section 23 by means of liquid refrigerant port 22.

As the motive gas ejected from nozzle 16 at a supersonic velocity is combined with evaporator suction gas and subcooled liquid refrigerant from port 22, the gaseous motive fluid and evaporator suction gas immediately begin to condense into a liquid. As the mixture further travels through condensing section 23 and throat T, the condensation of the mixture is completed and the change in momentum of the fluid moving at constant velocity increases the force on check valve 27 and check valve 28 until one or both open.

Upon initial start-up of the system, pressure on the forward side of valve 28 is lower than the pressure in subcooler 32. Therefore, until sufficient pressure is built up to allow the condensed fluid to travel through check valves 27 and 28, fluid travels through flow line 46 through differential pressure valve 30 into the lower pressure side of the system, i.e., to evaporator 18. Once the pressure in line 46 is higher than the pressure in boiler return line 36, differential pressure valve 30 closes and the fluid condensed in condensing section 23 takes the route through check valve 28 and through subcooler 32. Some of the condensed liquid also flows through check valve 27 and line 48 back to boiler 10. From the subcooler 32 some of the fluid flows into variable volume reservoir 34; boiler pressure in line 36 is transmitted via the diagram 56 to the liquid in the subcooler 32. The liquid passing through check valve 27 after the differential pressure valve 30 closes feeds the boiler 10 with saturated, not subcooled, liquid, thereby conserving heat. Some of the liquid from subcooler 32 is routed through line 50 to provide the subcooled liquid refrigerant necessary to be injected through subcooled liquid refrigerant port 22 for combination with the motive and evaporator suction gases ejected from nozzle 16 of jet operated pump 44. Some of the liquid from subcooler 32 is routed through valve 52 and thermoexpansion valve 26 to evaporator 18 to satisfy cooling requirements.

Figure 2:
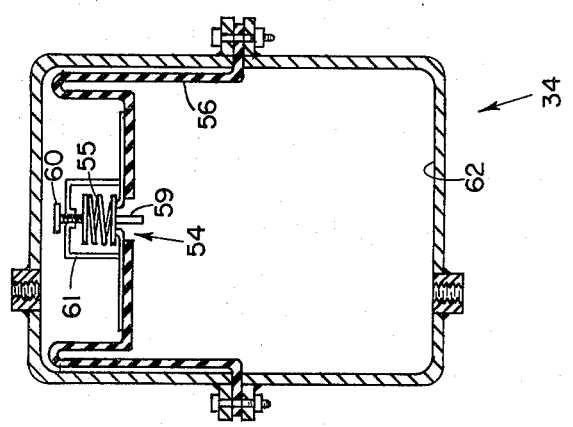
FIG. 2 is a cross-sectional view of a roll sock seal type of variable volume reservoir that may be used in the present invention.
Figure 5:
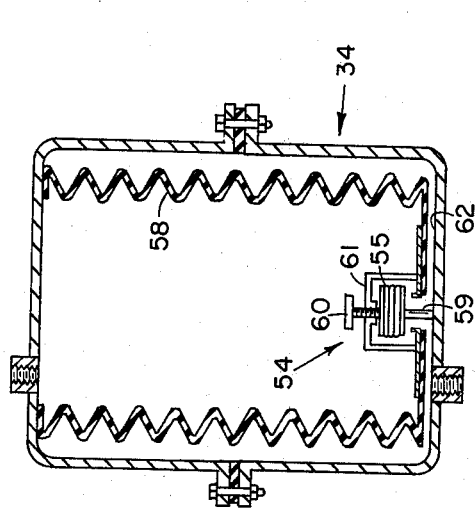
FIG. 5 is a cross-sectional view of a bellows variable volume reservoir as may be utilized in the present invention.

The variable volume reservoir 34 as depicted in FIG. 1 allows for pressure variances between the two phases of the operation of the invention system; in other words, start-up operation and the continuous operation, so the system can stay balanced. At the same time, the variable volume reservoir 34 provides a method for keeping pressure on the subcooler 32 liquid. The variable volume reservoir 34 may be either a variable rolling diaphragm type as pictured in FIG. 2, or a bellows type as depicted in FIG. 5, each of which will be explained more fully subsequently. A four-way connection comes out of the subcooler 32, one of the connections going into the top of variable volume reservoir 34. Within either type of variable volume reservoir 34, the variable rolling diaphragm type of FIG. 2 or the bellows type of FIG. 5, is valve 54. Valve 54 is basically a pressure relief valve that is springloaded by spring 55 and can be set for any pressure differential desired. For example, if valve 24 were turned OFF and simultaneously valve 52 turned OFF, liquid would be trapped in subcooler 32 since valve 28 is a check valve. If the temperature went up with these valves closed, something within the system would break; therefore, the variable volume reservoir 34 in conjunction with valve 54 will prevent such circumstances. With increased pressure due to the closed valves 24 and 52, the diaphragm 56 of reservoir 34 of FIG. 2 or the bellows 58 of reservoir 34 of FIG. 5 would expand causing plunger 59 to contact the bottom 62 of reservoir 34 and allow the excess liquid to pass into boiler return line 36 subsequently back into boiler 10. The force of the plunger 59 is set thru spring 55 by set screw 60 in mounting cage 61.

The waste heat used to provide the motive force for evaporation of the motive fluid in the boiler 10 and the subsequent operation of the invention system can be any type of waste heat, such as hot water that might come from the cooling system of an automobile or it could be exhaust heat with an appropriate heat exchanger. Hot water from the automobile cooling system may be received in outer tube 40 in the tube-in-tube type boiler 10 at inlet 63 and expelled through outlet 64. When the pressure within boiler 10 reaches operating pressure, control valve 12 opens and allows the evaporating motive fluid to flow into jet operated pump 44. Control valve 12 may be activated by boiler pressure or it can be by electrically operated valve or even a hand valve. Many types of refrigerants could be used in this system, depending on temperature requirements and compatability of the refrigerant with the temperature of the heat source; however, the system must be designed for a specific refrigerant. Such a refrigerant is trichlorofluoromethane for the hot water system. Also suitable to be utilized would be other volatile liquids.

Figure 4:
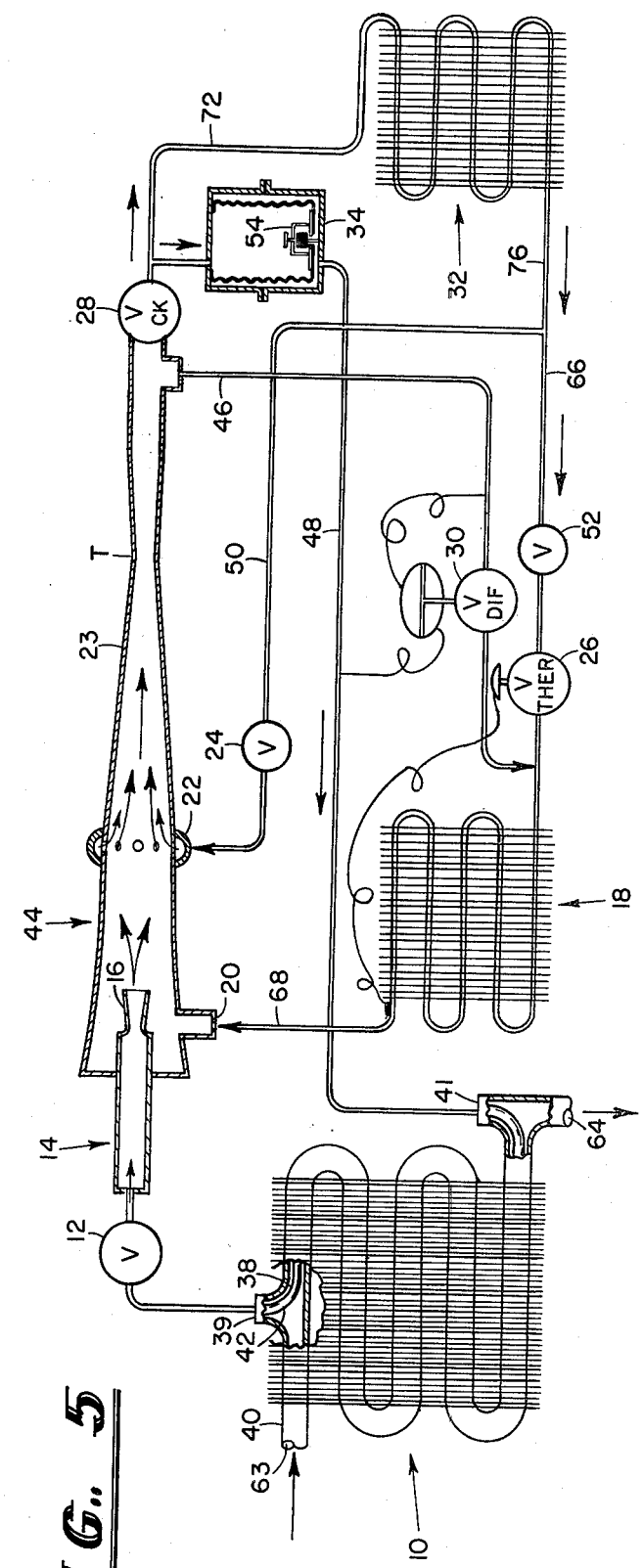
FIG. 4 is a schematic diagram similar to that as shown in FIG. 1 with the exception the variable volume reservoir is positioned on the inlet side of the subcooler as opposed to being on the outlet side as shown in FIG. 1.

FIG. 4 illustrates an alternative to the embodiment as shown in FIG. 1. The arrangement of each component in FIG. 4 is very similar to that in FIG. 1 with the exception of the connection to the variable volume reservoir 34. In FIG. 4, the reservoir is located on the front side of subcooler 32 as opposed to the back side as depicted in FIG. 1. With the variable volume reservoir 34 in this position as shown in FIG. 4, reservoir 34 serves as the path, thru check valve 54 within the reservoir 34, for the condensed motive fluid to return to the boiler 10. Reservoir 34 also serves in this configuration its function of transmitting boiler pressure to the liquid when there is no flow back to the boiler 10.

The system as depicted in FIG. 4 operates similarly to that in FIG. 1 with the motive gas from boiler 10 being conveyed into jet operated pump 44 and ejected from nozzle 16 at a supersonic velocity, whereupon a vacuum is drawn on evaporator 18 via evaporator suction port 20. The subcooled liquid refrigerant is likewise injected through port 22 into condensing section 23 to be mixed with the high velocity gas which is subsequently condensed. Similar to the operation of FIG. 1, check valve 28 prohibits the condensed liquid from traveling to subcooler 32 until such time as the pressure in line 46 is greater than the boiler pressure imposed on the front side of subcooler 32 whereupon differential pressure valve 30 will be activated, thereby causing the condensed liquid to be routed through check valve 28, into reservoir 34, and into subcooler 32. Cool condensed liquid from subcooler 32 travels down line 66 through valve 52 and thermostatic expansion valve 26 into evaporator 18 to satisfy refrigerating requirements controlled by thermostatic expansion valve 26, which operates in response to the temperature as signalled from the suction side of the evaporator 18 according to predetermined value ranges. The liquid entering reservoir 34 expands the bellows 58 or moves the diaphragm 56 until the internal check valve 54 opens, allowing the saturated, not subcooled, motive liquid to flow thru line 48 back to the boiler 10.

Figure 3:
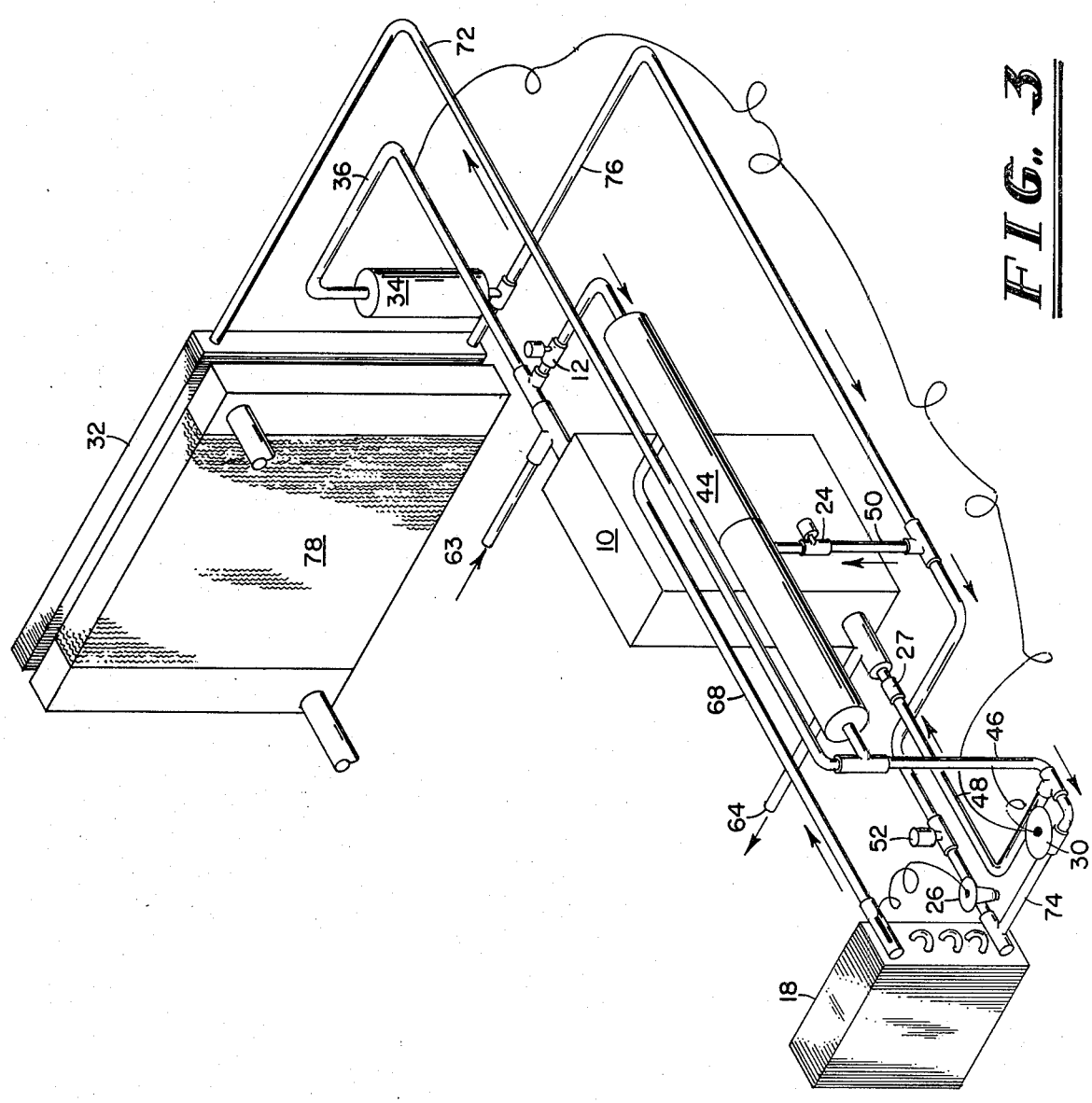
FIG. 3 is a perspective view of a cooling system of the present invention as it may be utilized in an automobile. The main components of the system are the boiler, condensing portion, evaporator, variable volume reservoir, subcooler, the jet operated pump, and various valves, as in FIG. 1 schematic, with the automobile radiator 78 being shown for perspective.

The cooling system utilizing a jet operated pump equivalent to schematic FIG. 1 is illustrated in FIG. 3 wherein the system is used in conjunction with the cooling water of an automobile. Hot water from the engine is introduced into the tube-in-tube type boiler 10 via inlet 63 and is allowed to exit boiler 10 via outlet 64. When the motive gas within the inner tube (not shown) of the boiler 10 reaches the predetermined pressure as monitored by control valve 12, the motive gas is introduced into the pumping section of jet operated pump 44 having within nozzle 16 (not shown). The motive gas is ejected from nozzle 16 at supersonic velocity thereby causing a vacuum to be drawn on evaporator 18 and the evaporator suction gas to be drawn into condensing section 23 of jet pump 44 via line 68. Condensation occurs when supersonic velocity motive gas mixes with subcooled liquid refrigerant injected into condensing section 23 via line 50 and valve 24.

As discussed previously in reference to FIGS. 1 and 4, the liquid condensate projects forward at constant velocity through condensing section 23 and into evaporator 18 momentarily until sufficient pressure is developed to turn OFF differential pressure valve 30, and, when sufficient pressure has been developed, project the liquid condensate to subcooler 32 via line 72 and to boiler 10 via line 48 after passing through check valve 54 of reservoir 34. If sufficient pressure has not been developed to turn OFF differential pressure valve 30, liquid condensate flows through line 46 and into the lower pressure side of the system, i.e., to evaporator 18. This process continues only until differential pressure valve 30 indicates pressure in line 46 is higher than the pressure in line 36, at which time the flow of liquid condensate is diverted in part through check valve 27 into the boiler 10, and in part thru line 72 into subcooler 32. In subcooler 32, additional heat is extracted from the liquid condensate, therefore cooling the liquid even further. The cooled condensate travels from the bottom of subcooler 32 through line 76 whereupon some of the condensate is extracted to be utilized in the subcooled liquid refrigerant injected through line 50 and valve 24 into condensing section 23 of jet pump 44. Another portion of the condensate is transported to evaporator 18 thru valve 52 and thermo-expansion valve 26.

As can be readily ascertained, the fan (not shown) utilized for the radiator 78 located adjacent to subcooler 32 may be used to remove the heat discharged from the cooling of the liquid in subcooler 32. The evaporator 18 may easily be used as an air conditioner in an automobile.

FIG. 6 shows a heating and/or cooling system of the invention wherein a reversing valve is utilized to allow a single system to function as both a heating system and a cooling system by merely reversing a single valve. This system as depicted in FIG. 6 operates in substantially the same manner as discussed for FIG. 4 with the major exceptions being reversing valve 78 and check valve network 91. Heat is added to boiler 10 by any convenient means such as a hot fluid in a tube-in-shell boiler 79 emanating from appropriate heat sources. Pressure due to evaporation of the liquid refrigerant will build up to operating pressure and control valve 12 will open, allowing the motive gas to project into jet operated pump 44 and be ejected by nozzle 16 at a supersonic velocity. Upon ejection of motive gas at this substantial velocity, a vacuum is drawn on evaporator 18 through port 20, line 80, reversing valve 78, and line 82. The reversing valve 78 is in the position shown.

Again as in the previous descriptions of start-up of the system, the motive gas ejected from nozzle 16 combines with the subcooled liquid injected via subcooled liquid refrigerant port 22 and is condensed as it travels at constant velocity thru condensing section 23. If the pressure in line 46 is lower than the pressure in line 36 as monitored by the differential pressure valve 30, liquid will travel down line 46 to the low pressure side of the system via differential pressure valve 30 and valving network 91 as will be subsequently explained. At such time as the pressure in line 46 is greater than the pressure in line 36, differential pressure valve 30 will close, thereby causing the liquid to be diverted through check valve 28 with a part flowing through lines 84 and 86 via reversing valve 78 as shown in FIG. 6, to subcooler 32, and a part flowing into variable volume reservoir 34. Variable volume reservoir 34 functions in the same way as previously described in reference to FIG. 4.

With reversing valve 78 in the position as shown in FIG. 6, coil 18 functions as an inside evaporator coil for refrigeration while coil 32 functions as an outside subcooling coil, as in FIG. 4. The liquid from coil 32 is fed back into coil 18 by way of line 88 through check valves 90 and 92 and thermo-expansion valve 94 of the valving network 91.

To make coil 18 the heating coil and coil 32 the evaporator coil, reversing valve 78 is reversed from the position as shown in FIG. 6 to the position shown in FIG. 6a. With reversing valve 78 in the position shown in FIG. 6a, lines 80 and 86 are in fluid communication with each other and outside coil 32. The liquid out of inside coil 18, now the subcooler, now has to flow through check valves 96 and 98 and thermo-expansion valve 100 to outside coil 32, now the evaporator. The flow of liquid from inside coil 18 or outside coil 32 is blocked by check valve 102 as liquid flows into line 88.

The liquid will not flow back through check valves 90 and 92 and thermo-expansion valve 94 because the pressure is higher in coil 18 than in line 88. Check valves 101 and 102 are provided to allow differential pressure valve 30 to function with the reversing valve in either position.

The heating and cooling system as illustrated in FIG. 6 can be easily installed to be utilized in a building to provide both refrigerated air and heating. With reversing valve 78 in position as shown in FIG. 6, inside coil 18 functions as an evaporator and outside coil 32 functions as the subcooler. In this capacity, inside coil 18 functions to provide refrigerated air to a confined area of the building. By switching the reversing valve 78 to the position shown in FIG. 6a, inside coil 18 will now function as a subcooler, while outside coil 32 will then function as an evaporator. In this capacity, inside coil 18 would function to provide heated air to a confined area while outside coil 32 would absorb heat from an appropriate source, which might be the same source as that for the boiler 10.

While the invention has been described in connection with the preferred embodiments, it is not intended to limit the invention to the particular form set forth, but, on the contrary, it is intended to cover such alternative modifications and equivalents and applications as may be included within the spirit and scope of the invention as defined by the appended claims.

I claim:

1. A jet pump heating and/or cooling system operating from waste heat that causes evaporation of a refrigerant comprising:

boiler means for receiving said waste heat to evaporate said refrigerant contained therein;

jet pump having a nozzle therein for discharging said refrigerant in a gaseous state therefrom at a high velocity, said discharge creating a vacuum;

evaporator means being connected to said jet pump and said vacuum therein, said vacuum drawing said refrigerant in a gaseous form from said evaporator means into said jet pump;

means for supplying said refrigerant in a liquid form to said jet pump to cause condensation of said gaseous form of said refrigerant inside said jet pump; and subcooler means for receiving said condensate form of refrigerant to remove heat therefrom and subsequently flow to said evaporator means, said condensate being supplied to said boiler means separately from said subcooler means.

2. The jet pump heating and/or cooling system of claim 1 comprising variable volume reservoir means as part of said means for supplying, said reservoir means collecting said refrigerant in liquid form therein.

3. The jet pump heating and/or cooling system of claim 2 wherein said variable volume reservoir means has valve means therein to pass said refrigerant therethrough to said boiler means upon receiving a predetermined pressure thereacross.

4. The jet pump heating and/or cooling system as recited in claim 3 wherein said variable volume reservoir is of a variable rolling diaphragm type.

5. The jet pump heating and/or cooling system as recited in claim 3 wherein said variable volume reservoir is of a bellows type.

6. The jet pump heating and/or cooling system as given in claim 1 having valving means for initially allowing start-up with said condensate from said jet pump bypassing said subcooler means and said boiler means and thereafter flowing said condensate to said subcooler means and said boiler means after start-up.

7. The jet pump heating and/or cooling system are recited in claim 6 comprising a control valve between said boiler means and said jet pump to insure adequate vapor pressure to insure said high velocity discharge is supersonic.

8. The jet pump heating and/or cooling system as given in claim 2 wherein said variable volume reservoir means is connected on a first side between said jet pump and said subcooler means, and on a second side to said boiler means.

9. The jet pump heating and/or cooling system as given in claim 2 wherein said variable volume reservoir means is connected on a first side to a discharge side of said subcooler means, and on a second side between said boiler means and said jet pump.

10. The jet pump heating and/or cooling system of claim 6 wherein said valving means further includes a reversing valve with appropriate check valves for switching function of said evaporator means and said subcooler means between heating and cooling cycles.

11. The jet pump and/or cooling system of claim 1 wherein said boiler means includes a tube-within-a-tube with said waste heat being received therein via one of said tubes and transmitted to said refrigerant flowing through a second of said tubes.

* * * * *